(12) United States Patent
Miller et al.

(10) Patent No.: US 11,106,693 B2
(45) Date of Patent: Aug. 31, 2021

(54) DEVICE, SYSTEM AND METHOD FOR INTEROPERABILITY BETWEEN DIGITAL EVIDENCE MANAGEMENT SYSTEMS

(71) Applicant: MOTOROLA SOLUTIONS, INC., Chicago, IL (US)

(72) Inventors: Trent J. Miller, Chicago, IL (US); Daniel R. Bestor, Chicago, IL (US); Lee M. Proctor, Chicago, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days.

(21) Appl. No.: 17/011,232

(22) Filed: Sep. 3, 2020

(65) Prior Publication Data
US 2020/0401597 A1    Dec. 24, 2020

Related U.S. Application Data

(63) Continuation of application No. 16/359,113, filed on Mar. 20, 2019.

(51) Int. Cl.
*G06F 16/25* (2019.01)
*G06F 16/903* (2019.01)
(Continued)

(52) U.S. Cl.
CPC ........ *G06F 16/252* (2019.01); *G06F 11/3006* (2013.01); *G06F 11/3072* (2013.01);
(Continued)

(58) Field of Classification Search
CPC ............. G06F 16/252; G06F 16/90344; G06F 16/908; G06F 11/3006; G06F 11/3072; H04L 63/102; H04L 67/22; G06Q 50/26
See application file for complete search history.

(56) References Cited

U.S. PATENT DOCUMENTS

| 6,948,066 B2 | 9/2005 | Hind et al. |
| 7,266,546 B2 | 9/2007 | Son |

(Continued)

FOREIGN PATENT DOCUMENTS

WO     2017200529 A1    11/2017

OTHER PUBLICATIONS

Non-Final Rejection, dated Mar. 3, 2020 issued in corresponding U.S. Appl. No. 16/359,113, filed Mar. 20, 2019.
(Continued)

*Primary Examiner* — Jonathan A Bui
(74) *Attorney, Agent, or Firm* — Perry + Currier, Inc.

(57) ABSTRACT

A device, system and method for interoperability between digital evidence management systems (DEMS) is provided. A DEMS proxy computing device received, from a requesting device, a search string requesting digital evidence. The proxy provides, to a plurality of separate DEMS devices maintained by separate public safety agencies: corresponding search strings; and identification information identifying one or more of: a public safety role of a user of the requesting device, and a public safety agency membership of the user. The proxy receives, from at least a particular DEMS device, of the plurality of separate DEMS devices, a digital evidence record based on the search string, the digital evidence record describing a piece of digital evidence managed by the particular DEMS device, and including chain-of-custody information. The proxy provides, to the requesting device, the digital evidence record and the chain-of-custody information.

14 Claims, 6 Drawing Sheets

600

```
RECOMMENDED COLLABORATIONS:
    USERS THAT HAVE ACCESSED "VIDEO_FILE_EXAMPLE.MP4" : DETECTIVE
JEROME DANIELS-SAN ANTONIO PD, DETECTIVE JOHN CHENNEY-HARRIS COUNTY PD,
SERGEANT ADAM LEWIS-DALLAS PD
    USERS THAT HAVE ACCESSED "VIDEO_FILE_EXAMPLE.MP4" WITH YOUR ROLE:
        DETECTIVES: JEROME DANIELS-SAN ANTONIO PD, DETECTIVE JOHN
    CHENNEY-HARRIS COUNTY PD
    USERS THAT HAVE SEARCHED FOR INFORMATION ASSOCIATED WITH THE
"VIDEO_FILE_EXAMPLE.MP4" :
        PERPETRATOR RALPH WELLS: DETECTIVE JEROME DANIELS-SAN
ANTONIO PD, SERGEANT ADAM LEWIS-DALLAS PD
    USERS THAT HAVE SEARCHED FOR A LOCATION AND/OR A TIME ASSOCIATED
WITH THE "VIDEO_FILE_EXAMPLE.MP4" AND/OR "RALPH WELLS" :
        DETECTIVE JOHN CHENNEY-HARRIS COUNTY PD
```

(51) Int. Cl.
*G06F 16/908* (2019.01)
*G06F 11/30* (2006.01)
*H04L 29/06* (2006.01)
*H04L 29/08* (2006.01)
*G06Q 50/26* (2012.01)

(52) U.S. Cl.
CPC ...... *G06F 16/908* (2019.01); *G06F 16/90344* (2019.01); *H04L 63/102* (2013.01); *H04L 67/22* (2013.01); *G06Q 50/26* (2013.01)

(56) References Cited

U.S. PATENT DOCUMENTS

| | | | |
|---|---|---|---|
| 7,603,344 B2 | 10/2009 | Bousquet et al. | |
| 10,091,615 B1 | 10/2018 | Ledet | |
| 2002/0113707 A1* | 8/2002 | Grunes | G06K 1/18 340/572.1 |
| 2004/0103087 A1* | 5/2004 | Mukherjee | G06F 16/951 |
| 2008/0168135 A1 | 7/2008 | Redlich et al. | |
| 2008/0301471 A1 | 12/2008 | Demarest et al. | |
| 2009/0171950 A1* | 7/2009 | Lunenfeld | G06Q 30/0601 |
| 2010/0010968 A1 | 1/2010 | Redlich et al. | |
| 2010/0251305 A1* | 9/2010 | Kimble | H04N 21/44222 725/46 |
| 2010/0305992 A1* | 12/2010 | Michalzuk | G06Q 10/06398 705/7.42 |
| 2011/0004590 A1* | 1/2011 | Lilley | G06Q 10/06 707/723 |
| 2013/0124504 A1* | 5/2013 | Haugen | G06Q 50/01 707/722 |
| 2013/0254133 A1* | 9/2013 | Connell | G06Q 10/10 705/342 |
| 2014/0090081 A1* | 3/2014 | Mattsson | G06F 21/6227 726/27 |
| 2014/0143545 A1* | 5/2014 | McKeeman | H04L 63/0853 713/168 |
| 2015/0019537 A1* | 1/2015 | Neels | G06F 16/24575 707/722 |
| 2015/0244872 A1 | 8/2015 | Hoover | |
| 2016/0063010 A1* | 3/2016 | Townsend | G06Q 50/28 707/724 |
| 2016/0210355 A1* | 7/2016 | Krantz, III | G06F 16/335 |
| 2016/0259794 A1 | 9/2016 | Heckman et al. | |
| 2017/0236229 A1* | 8/2017 | Roof | G06K 9/00577 705/345 |
| 2020/0042945 A1* | 2/2020 | Schuler | G06Q 10/10 |
| 2020/0104329 A1* | 4/2020 | Kundu | G06F 16/9538 |

OTHER PUBLICATIONS

ISA/EP, International Search Report and Written Opinion, dated May 13, 2020 re PCT International Patent Application No. PCT/US2020/022049.

* cited by examiner

500

SEARCH STRING: RALPH WELLS ← 501

RESULT: VIDEO_FILE_EXAMPLE.MP4 ← 502

503 {
CAPTURED BY: OFFICER JOHN SMITH, SAN ANTONIO PD
CAPTURED DATE: 11/7/2018, 23:11:01, DURATION 00:06:23
CAPTURE LOCATION: LATITUDE: 41.7958639, LONGITUDE: -87.9756175
CAPTURE DEVICE IDENTIFIER: MAC ADDRESS 00-14-22-01-23-45
CRC CODE: 0X04C11DB7

505 {
STORED IN: SAN ANTONIO PD DEMS (CRC CODE: 0X04C11DB7)
   ACCESSED BY: DETECTIVE JEROME DANIELS, 11/8/2018, 09:23
     COMMENTS: CASE 1234567890
     COMMENTS: IDENTIFIED PERPETRATOR RALPH WELLS @ INDEX 00:02:21

ACCESSED BY: DETECTIVE JEROME DANIELS, 11/10/2018, 09:25
COPIED TO: HARRIS COUNTY PD DEMS (CRC CODE: 0X04C11DB7)
   ACCESSED BY: DETECTIVE JOHN CHENNEY, 11/26/2018, 07:46
     COMMENTS: CASE 987654321

COPIED TO: DALLAS PD DEMS (CRC CODE: 0X04C11DB7)
   ACCESSED BY: SERGEANT ADAM LEWIS, 11/14/2018, 15:26
     COMMENTS: CASE 8475611994
     COMMENTS: PERPETRATOR RALPH WELLS

507 — REQUEST VIDEO FILE

509 — REQUEST COLLABORATION SUGGESTIONS

RECOMMENDED COLLABORATIONS:
    USERS THAT HAVE ACCESSED "VIDEO_FILE_EXAMPLE.MP4" : DETECTIVE JEROME DANIELS-SAN ANTONIO PD, DETECTIVE JOHN CHENNEY-HARRIS COUNTY PD, SERGEANT ADAM LEWIS-DALLAS PD
    USERS THAT HAVE ACCESSED "VIDEO_FILE_EXAMPLE.MP4" WITH YOUR ROLE:
        DETECTIVES: JEROME DANIELS-SAN ANTONIO PD, DETECTIVE JOHN CHENNEY-HARRIS COUNTY PD
    USERS THAT HAVE SEARCHED FOR INFORMATION ASSOCIATED WITH THE "VIDEO_FILE_EXAMPLE.MP4" :
        PERPETRATOR RALPH WELLS: DETECTIVE JEROME DANIELS-SAN ANTONIO PD, SERGEANT ADAM LEWIS-DALLAS PD
    USERS THAT HAVE SEARCHED FOR A LOCATION AND/OR A TIME ASSOCIATED WITH THE "VIDEO_FILE_EXAMPLE.MP4" AND/OR "RALPH WELLS" :
        DETECTIVE JOHN CHENNEY-HARRIS COUNTY PD

FIG. 6

DEVICE, SYSTEM AND METHOD FOR INTEROPERABILITY BETWEEN DIGITAL EVIDENCE MANAGEMENT SYSTEMS

CROSS-REFERENCE TO RELATED APPLICATIONS

This application is a continuation of U.S. patent application Ser. No. 16/359,113, filed on Mar. 20, 2019, the entire contents of which is incorporated herein by reference.

BACKGROUND OF THE INVENTION

Presently, digital evidence management systems (DEMS) are ad-hoc with limited interoperability therebetween. For example, public safety agencies, such as police agencies, and the like, generally maintain their own DEMS which may not be accessible outside the agency.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5 is an example of a aggregated search results that one or more digital evidence records and chain-of-custody information generated by a digital evidence management proxy computing device, in accordance with some examples.

FIG. 6 is an example of collaboration suggestions generated by a digital evidence management proxy computing device, in accordance with some examples.

Figure 1:
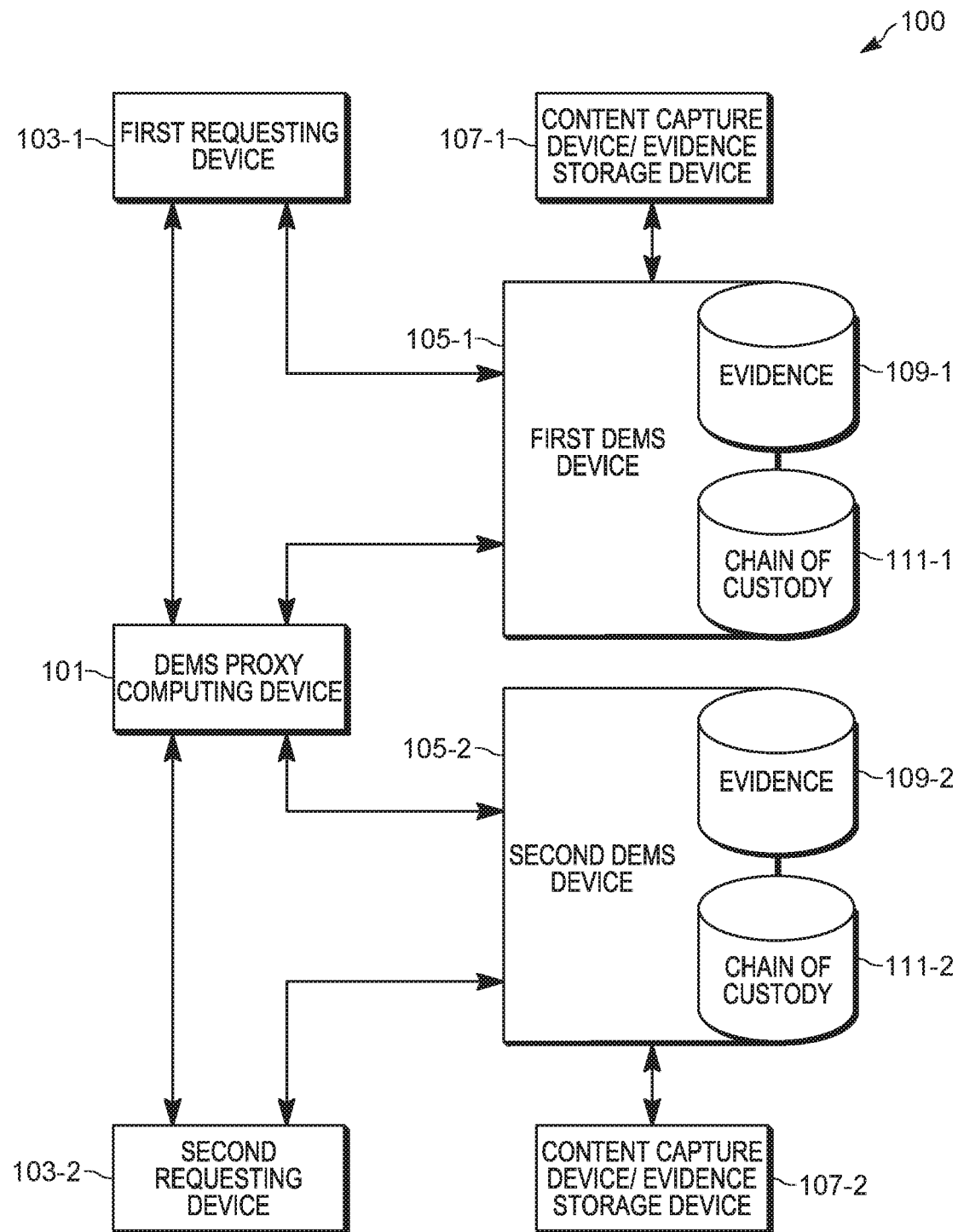
FIG. 1 is a system for interoperability between digital evidence management systems, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Although the proliferation of digital content continues, public safety agents (e.g. police detectives) are often limited in their ability to locate digital content relevant to their cases. While they frequently have direct access to their own agency's digital evidence management service and/or system (DEMS, which, may also be interchangeably referred to as a DEMS system), searching for content in a neighboring jurisdiction's DEMS may be difficult due to policy, security, and technology limitations. Presently, DEMS are ad-hoc with limited interoperability therebetween. For example, separate public safety agencies, such as police agencies, justice departments, and the like, generally maintain their own separate and/or independent DEMs which may not be accessible outside of an agency. Hence, in order for members of a given agency to access a DEMS of one or more second agencies, each of the one or more second agencies must set up special access terminals and/or special software to access their respective DEMs, for example at offices of the given agency. Alternatively, a detective from the given agency would have to speak to a detective from a second agency in order to manually obtain a copy of digital content from the second agency's DEMS. Thus, when many users want to access the DEMSs of many other agencies, processing and hardware resources are wasted in manually setting up, maintaining, and tearing down the special access terminals and/or special software.

Furthermore, because chain-of-custody information as set forth herein is not always integrated with digital evidence databases and/or DEMS systems, and not made available in the manner set forth herein, receiving DEMS systems may have difficulty electronically processing and assessing the trustworthiness and reliability of received DEMS records. Still further, because search strings are not generally accompanied by public safety role and/or agency information, which can then be stored in each target DEMS system, it may be difficult or impossible to provide electronic recommendations or instructions for agency collaboration in future search results based on originating DEMS user's roles and/or agencies.

An aspect of the present specification provides a method to establish interoperability between multiple independent digital evidence management systems (DEMS) devices, the method comprising: receiving, at a DEMS proxy computing device, from a requesting device, a search string requesting digital evidence; providing, from the DEMS proxy computing device, to a plurality of separate DEMS devices maintained by separate public safety agencies: corresponding search strings; and identification information identifying one or more of: a public safety role of a user of the requesting device, and a public safety agency membership of the user; receiving, at the DEMS proxy computing device, from at least a particular DEMS device, of the plurality of separate DEMS devices, a digital evidence record based on the search string, the digital evidence record describing a piece of digital evidence managed by the particular DEMS device, and including chain-of-custody information; and providing, from the DEMS proxy computing device, to the requesting device, the digital evidence record and the chain-of-custody information.

An aspect of the present specification provides a device to establish interoperability between multiple independent digital evidence management systems (DEMS) devices, the device comprising: a communication unit; and a controller interconnected with the communication unit, the controller configured to: receive, via the communication unit, from a requesting device, a search string requesting digital evidence; provide, via the communication unit, to a plurality of separate DEMS devices maintained by separate public safety agencies: corresponding search strings; and identification information identifying one or more of: a public safety role of a user of the requesting device, and a public safety agency membership of the user; receive, via the communication unit, from at least a particular DEMS device, of the plurality of separate DEMS devices, a digital evidence record based on the search string, the digital evidence record describing a piece of digital evidence managed by the particular DEMS device, and including chain-of-custody information; and provide, via the communication unit, to the requesting device, the digital evidence record and the chain-of-custody information.

Indeed, a DEMS generally comprises one or more devices and/or servers and/or databases which stores digital evidence including, but not limited to, digital images, digital video, digital audio, and/or any other digital evidence which may be collected in association with an incident and/or crime, and which may be used in researching crimes, litigation, prosecution of criminals, and the like, and/or used in trials and the like. Further examples of digital evidence are described below. A DEMS may be searchable using a retrieval application and the like, for example as implemented at a terminal for searching the DEMS. As such, the digital evidence stored at a DEMS may be indexed in a database for searching.

Attention is directed to FIG. 1, which depicts an example system 100 for establishing interoperability between multiple independent digital evidence management systems (DEMS). The system 100 comprises a DEMS proxy computing device 101 (interchangeably referred to hereafter as the device 101), in communication with at least one requesting device and at least one DEMS device. For example, as depicted, the system 100 comprises a first requesting device 103-1 and a second requesting device 103-2, and a first DEMS device 105-1, and a second DEMS device 105-2. The first requesting device 103-1 and the second requesting device 103-2 are interchangeably referred to hereafter, collectively, as the requesting devices 103 and, generically, as a requesting device 103; similarly, the first DEMS device 105-1 and the second DEMS device 105-2 are interchangeably referred to hereafter, collectively, as the DEMS devices 105 and, generically, as a DEMS device 105.

Communication links between components of the system 100 are depicted in FIG. 1, and throughout the application, as double-ended arrows between respective components. In particular, the DEMS proxy computing device 101 and the plurality of separate DEMS devices 105 may communicate via respective authenticated communication links. While not depicted, the components of the system 100 may communicate using one or more communication networks.

Each pair of a requesting device 103 and a DEMS device 105 (such as the first requesting device 103-1 and the first DEMS device 105-1) may be associated with separate public safety agencies such as separate police and/or justice agencies and the like (e.g. separate civic police and/or justice departments within a county and/or state, and the like) and each requesting device 103 may be configured for searching an associated DEMS device 105. Put another way, each of the depicted DEMS devices 105 comprises an independent DEMS device 105 that are separate from one another. Each requesting device 103 may comprise a terminal, and the like used for searching an associated DEMS device 105. Hence, as depicted, a communication link is between each requesting device 103 and an associated DEMS device 105. However, in other examples, a requesting device 103 may be associated with and/or integrated with the device 101. In yet further examples, a requesting device 103 may not be associated with the device 101, and/or a requesting device 103 may not be associated with a DEMS device 105; in these latter examples, a requesting device 103 may be configured to communicate with the device 101 but not a DEMS device 105.

Regardless, a requesting device 103 of one public safety agency may not be able to directly search and/or interact with another independent and/or separate DEMS device 105 of another independent and/or separate public safety agency. For example, as depicted, the first requesting device 103-1 may be for searching the first DEMS device 105-1, but the first requesting device 103-1 may not be able to directly search the second DEMS device 105-2 without modifications to software of the first requesting device 103-1 to format searches specifically for the second DEMS device 105-2 and without also setting up connections to the second DEMS device 105-2: as depicted there is no communication link between the first requesting device 103-1 and the second DEMS device 105-2.

As such, the device 101 is provided as a proxy device in communication with the requesting devices 103 and the DEMS devices 105, such that requesting devices 103 may search multiple independent DEMS devices 105 via the device 101, and not just an associated DEMS device 105, as described in further detail below. Furthermore, a requesting device 103 may communicate with the device 101 to search both an associated DEMS device 105 and other separate and/or independent DEMS devices 105. For example, the first requesting device 103-1 may communicate with the device 101 to simultaneously search both the first DEMS device 105-1 and the second DEMS device 105-2. Each of the DEMS devices 105 may use same or different protocols (and/or methods) to communicate with the device 101.

While as depicted, only two sets of requesting devices 103 and associated DEMS devices 105 are depicted, the system 100 generally comprises a plurality of requesting devices 103 and associated DEMS devices 105. Furthermore, as depicted each DEMS device 105 may be in further communication with one or more respective content capture devices and/or evidence storage devices each enabled to capture content and/or upload evidence to a respective DEMS device 105.

As depicted, for example, the first DEMS device 105-1 is in communication with one or more content capture and/or evidence storage devices 107-1, and the second DEMS device 105-2 is in communication with one or more content capture and/or evidence storage devices 107-2. The content capture and/or evidence storage devices 107-1, 107-2 are interchangeably referred to hereafter, collectively, as the evidence storage devices 107 and, generically, as an evidence storage device 107. Each of the evidence storage devices 107, for example, may comprise a communication device and/or portable device and/or non-portable device and/or terminal (e.g. used by members of an associated agency), which are used to capture and/or upload content to a respective DEMS device 105. An evidence storage device 107 may include, but are not limited to, one or more of body cameras, vehicular cameras, drone devices, mobile devices, fixed cameras and the like. In some examples, an evidence storage device 107 may be combined with a respective requesting terminal 103.

In particular, as depicted, each DEMS device 105 comprises, and/or is in communication with, one or more respective databases storing digital evidence and chain-of-custody data. For example, as depicted, the first DEMS device 105-1 comprises, and/or is in communication with, an evidence database 109-1 and a first chain-of-custody database 111-1, and the second DEMS device 105-2 comprises, and/or is in communication with, an evidence database 109-2 and a second chain-of-custody database 111-2. The evidence databases 109-1, 109-2 are interchangeably referred to hereafter, collectively, as the evidence databases 109 and, generically, as an evidence database 109; similarly, chain-of-custody databases 111-1, 111-2 are interchangeably referred to hereafter, collectively, as the custody databases 111 and, generically, as a custody database 111.

In a particular example, an evidence storage device 107 may comprise a body camera that originally captures a scene/incident/perpetrator (and/or suspect)/etc., and an evidence database 109 may comprise a central evidence storage database storing the digital evidence as uploaded from the body camera, with chain of custody for the digital evidence stored in an associated chain-of-custody database 111.

In general, the evidence databases 109 store digital evidence received from the evidence storage devices 107, and the custody databases 111 store chain-of-custody information and/or records of the digital evidence stored in the evidence databases 109. Examples of digital evidence include, but are not limited to two-dimensional (2D) and/or three-dimensional (3D) images and/or video, maps, routes, floor plans, sensor and telemetry readings, virtual and augmented reality imagery, stored data such as criminal and civil records, vehicle ownership records, computer aided dispatch records, voice data, biometric data such as iris, fingerprint, vein, or DNA information and the like. Digital evidence may, in some examples, include data derived by a computer analytic or algorithm. While the databases 109, 111 are depicted as separate at an associated DEMS device 105, the databases 109, 111 may be at least partially combined. Furthermore, the databases 109, 111 may be local and/or remote from an associated DEMS device 105.

Each of the DEMS devices 105 may comprise a respective computing device (including, but not limited to, one or more servers and/or one or more cloud computing devices) which maintains digital evidence and chain-of-custody information at the databases 109, 111. Furthermore, each of the DEMS devices 105 is generally configured to generate and transmit digital evidence records describing pieces of digital evidence maintained by the particular DEMS device 105 (e.g., stored at a respective database 109), and including chain-of-custody information (e.g., stored at a respective database 111).

Hence, for example, a digital photo and/or digital video and/or digital incident report, and the like, may be stored at a respective database 109 by a particular DEMS device 105, as received from respective evidence storage devices 107, and the particular DEMS device 105 may maintain chain-of-custody information for each piece of digital evidence at a respective database 111. For example, the chain-of-custody information generally comprises chronological digital documentation that records a sequence and/or sequences of custody of digital evidence stored at the databases 109, including, but not limited to, digital documentation of control, transfer, copying, analysis, and/or disposition of digital evidence. Furthermore, chain-of-custody information is generally distinct from an associated piece of digital evidence. For example, a record of digital evidence as stored at a database 111 may comprise a description of the digital evidence as well as associated chain-of-custody information, and indexed for searching, and a piece of digital evidence, as described above, may be stored at a database 109, indexed for searching. Each database 109, 111 may store respective links between a piece of digital evidence, and a records thereof.

For example, when members of public safety agencies (e.g. public safety agents) access and/or search for digital evidence at a respective database 109 via a particular DEMS device 105 and an associated requesting device 103 and/or terminal, the particular DEMS device 105 generally maintains a record of such access and/or such a search at a respective database 111.

Figure 2:
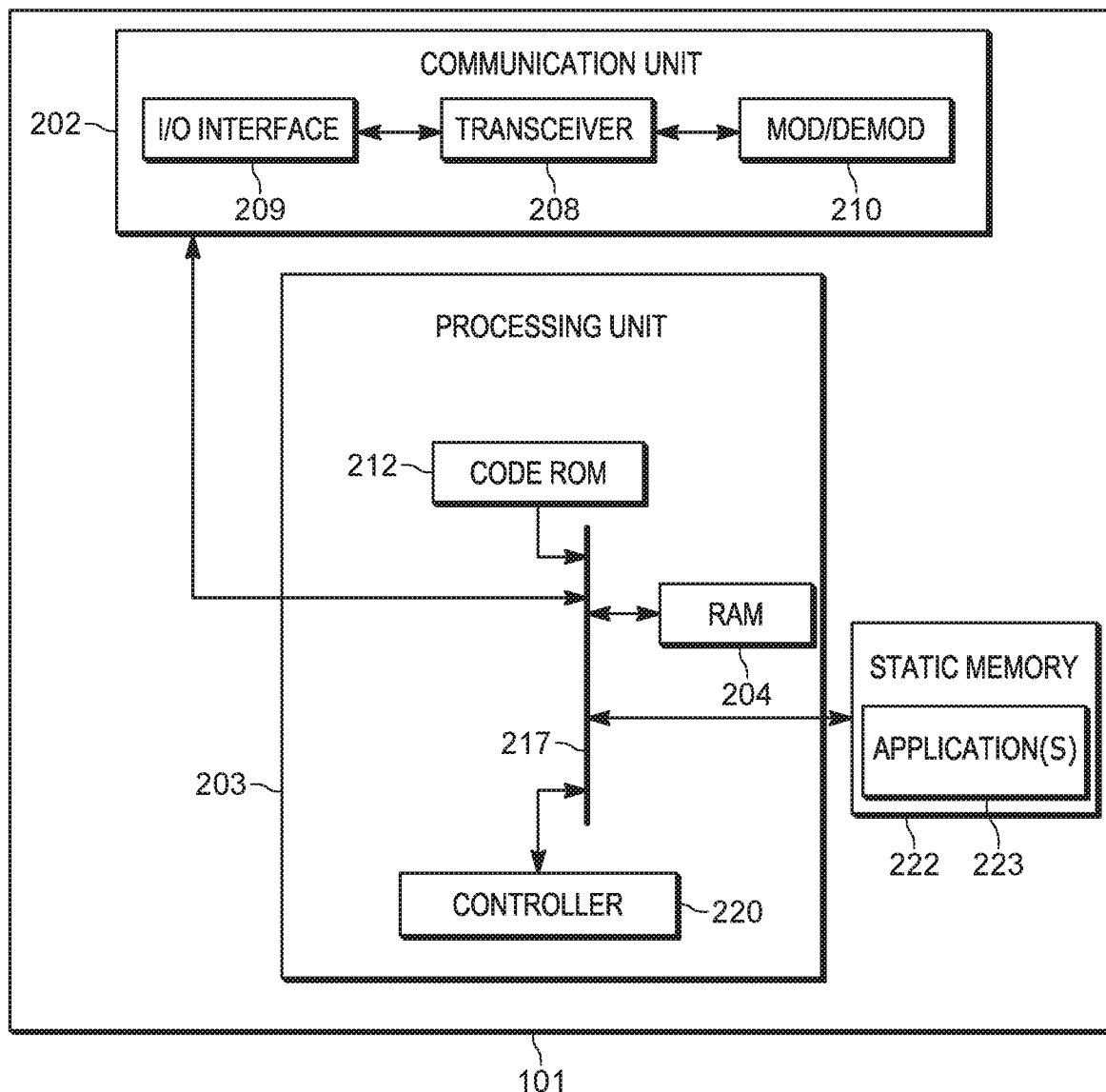
FIG. 2 is a device diagram showing a device structure of a device for interoperability between digital evidence management systems, in accordance with some examples.

Attention is next directed to FIG. 2 which depicts a schematic block diagram of an example of the device 101. In general, the device 101 may comprise one or more servers and/or one or more cloud computing devices, and the like, configured to communicate with the requesting devices 103 and the DEMS device 105. As depicted, the device 101 comprises: a communications unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

While not depicted, the device 101 may include one or more of at least one input device and a display screen and the like.

As shown in FIG. 2, the device 101 includes the communications unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communications unit 202 may include one or more wired and/or wireless input/output (I/O) interfaces 209 that are configurable to communicate with the requesting devices 103 and the DEMS devices 105. For example, the communication unit 202 may include one or more transceivers 208 and/or wireless transceivers for communicating with the requesting devices 103 and the DEMS devices 105. Hence, the one or more transceivers 208 may be adapted for communication with one or more communication networks used to communicate with the requesting devices 103 and the DEMS devices 105. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a Bluetooth transceiver, a Wi-Fi transceiver, a WiMAX transceiver, and/or another similar type of wireless transceiver configurable to communicate via a wireless radio network.

The communications unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the device 101 is not a generic controller and/or a generic device, but a device specifically configured to implement functionality for establishing interoperability between multiple independent DEMS devices. For example, in some examples, the device 101 and/or the controller 220 specifically comprises a computer executable engine configured to implement functionality for establishing interoperability between multiple independent DEMS devices.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the device 101 as described herein are maintained, persistently, at the memory 222 and used by the controller 220 which makes appropriate utilization of volatile storage during the execution of such programming instructions.

Figure 3:
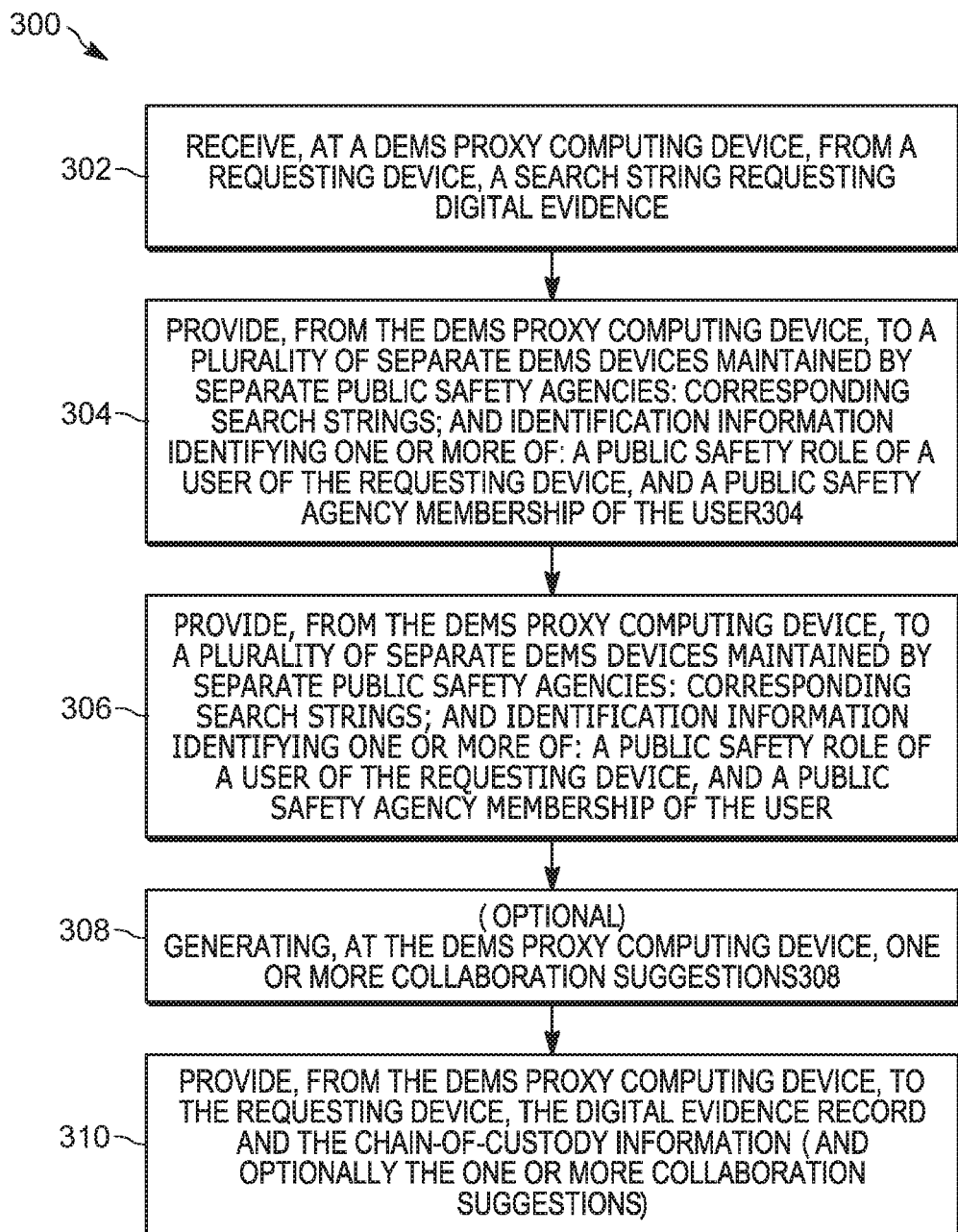
FIG. 3 is a flowchart of a method for interoperability between digital evidence management systems, in accordance with some examples.

In particular, the memory 222 stores instructions corresponding to the at least one application 223 that, when executed by the controller 220, enables the controller 220 to implement functionality for establishing interoperability between multiple independent DEMS devices including, but not limited to, the blocks of the process set forth in FIG. 3. In illustrated examples, when the controller 220 executes the one or more applications 223, the controller 220 is enabled to: receive, from a requesting device 103, a search string requesting digital evidence; provide, to a plurality of separate DEMS devices 105 maintained by separate public safety agencies: corresponding search strings; and identification information identifying one or more of: a public safety role of a user of the requesting device 103, and a public safety agency membership of the user; receive, from at least a particular DEMS device 105, of the plurality of separate DEMS devices 105, a digital evidence record based on the search string, the digital evidence record describing a piece of digital evidence maintained by the particular DEMS device 105 (e.g. as stored at a database 109 thereof), and including chain-of-custody information (e.g. as stored at a database 111 thereof); and provide, from the DEMS proxy computing device, to the requesting device 103, the digital evidence record and the chain-of-custody information.

In some examples, the memory 222 may further store a portion of digital evidence records and/or chain-of-custody information received from the particular DEMS device 105. For example, the device 101 may cache digital evidence records and/or chain-of-custody information received from the DEMS devices 105 for a given time period.

In yet further examples, the controller 220 and/or the device 101 may be configured to access chain-of-custody information and generate electronic collaboration suggestions when executing the one or more applications 223, and the electronic collaboration suggestions may be provided to the requesting device 103 with the digital evidence records and chain-of-custody information, as described in more detail below.

While not depicted, the device 101 may communicate with the requesting devices 103 and/or the DEMS devices 105 via respective applications programming interfaces (APIs). For example, each DEMS device 105 may include a respective API for the device 101, and the controller 220, when executing the application 223, may generate corresponding search strings, from the search string received from the requesting device 103, according to each respective API. Similarly, the device 101 may communicate with the requesting devices 103 via respective APIs.

While details of the devices 103, 105 are not depicted, each of the devices 103, 105 may have components similar to the device 101 adapted, however, for the respective functionality of the devices 103, 105.

In particular, the requesting devices 103 may each include at least one input device and a display screen used for interactions with a user and/or a public safety agent. Indeed, when a requesting device 103 comprises a terminal, a user (e.g. public safety agent including, but not limited to, a public safety agency employee), may log into a requesting device 103 by entering a user identifier at an input device, and the like. The user identifier may be associated with identification information identifying one or more of: a public safety role (e.g. a rank, a job title, and the like) of a user of the requesting device 103, a public safety agency membership of the user (e.g. a name of an agency, or unique electronic identifier associated with the agency, of which the user is an employee), an employee number, a badge number, a computer aided dispatch (CAD) identifier, and the like. Such identification information may be retrieved by the requesting device 103 at an employee database and the like using the user identifier.

In some examples, the device 101 may be disposed at a same location, agency, or computing device as a particular one of the requesting devices 103, a particular one of the DEMS devices 105, or may be located at an independent location or may be an independent on-premises computing device or cloud computing cluster that is not associated with any particular agency, requesting device 103, and/or DEMS device 105.

Attention is now directed to FIG. 3 which depicts a flowchart representative of a method 300 for establishing interoperability between multiple independent digital evidence management systems (DEMS) devices. The operations of the method 300 of FIG. 3 correspond to machine readable instructions that are executed by the device 101, and specifically the controller 220 of the device 101. In the illustrated example, the instructions represented by the blocks of FIG. 3 are stored at the memory 222 for example, as the application 223. The method 300 of FIG. 3 is one way in which the controller 220 and/or the device 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 and/or the device 101 receives, from a requesting device 103, a search string requesting digital evidence. For example, a user (e.g. a public safety agent) of a requesting device 103 may operate the requesting device 103 (e.g. using an input device) to enter a search string for searching the DEMS devices 105 for digital evidence. The search string may be transmitted to the device 101 to cause the device 101 to search, not only a DEMS device 105 associated with the requesting device 103 operated by the user, but other DEMS devices 105 in communication with the device 101. In some examples, the user operating the requesting device 103 may specify which DEMS devices 105 to search and the DEMS devices 105 to search may be transmitted with the search string; in other examples, the controller 220 and/or the device 101 may store a default list and/or mapping of allowed/authorized DEMS devices 105 to search based on the user's agency and/or an identifier of the user may be used to identify which DEMS devices 105 to search. In yet further examples, the controller 220 and/or the device 101 may search all known DEMS devices 105 in communication therewith.

The search string may be transmitted with identification information and/or metadata identifying one or more of: case information (e.g. a case number) associated with the user of the requesting device 103, a public safety role of the user of the requesting device 103, a public safety agency membership of the user, an incident associated with the user, an employee number, a badge number, a CAD identifier of the user, and the like. The identification information may be transmitted with the search string and/or incorporated into the search string as metadata and the like. In some examples, the identification information further identifies a user identity of the user of the requesting device 103.

In yet further examples, the controller 220 and/or the device may parse the search string into different search strings and selectively transmit the different search strings to different DEMS devices 105. For example, the device 101 may store data indicative of types of digital evidence stored at respective databases 109 associated with the DEMS device 105. In a particular examples, the device 101 may store data indicating that the DEMS device 105-1 does not have access to vehicle ownership records. Hence, when the search string includes a first search string for an accident record and a second search sting for an owner of a car having a particular license plate number, the device 101 may transmit the first search string to the DEMS device 105-1 (i.e., but not the second search string) and transmit both the first search string and the second search string to the DEMS device 105-2.

The search string may further be transmitted with other metadata including, but not limited to, a date and/or date range, a time and/or time range, a location and/or geographic area for the search (which may include some DEMS devices 105 and exclude other DEMS devices 105), and the like.

In yet further examples, the search string may include a request for "indexed metadata" of digital evidence, for example, names and/or objects identified in video digital evidence and/or audio digital evidence and the like.

In yet further examples, the search string may further be transmitted with other metadata including, but not limited to, at least a partial history of other searches (e.g., within the last few hours (e.g. 1 to 24 hours), days (e.g. 1 to 14 days), weeks (e.g. 1 to 12 weeks) or months (e.g. 1 to 6 months), and the like) by the user and/or agency of the requesting device 103. Such partial history of other searches may be stored at a memory accessible by requesting device 103

At a block 304, the controller 220 and/or the device 101 provides, to a plurality of separate DEMS devices 105 maintained by separate public safety agencies: corresponding search strings; and the identification information identifying one or more of: case information associated with the user of the requesting device 103, a public safety role of a user of the requesting device 103, a public safety agency membership of the user and/or an incident associated with the user. The identification information may further include any other suitable data and/or metadata associated with a search, and/or received from the requesting device 103 with the search string, including, but not limited to, a name of the user, a telephone number of the user, an email address of the user, a website of the user, an identification number of the user, and/or other identifying information.

Indeed, in some of these examples, the identification information identifies a user identity of the user of the requesting device 103 and further includes one or more of a public safety role of a user of the requesting device 103, and the like.

Furthermore, the identification information may further include any of the identification information and/or metadata received from the requesting device 103 and/or the corresponding search strings generated by the device 101 may include any of the identification information and/or metadata received from the requesting device 103.

The corresponding search strings and the identification information are provided to the plurality of separate DEMS devices 105 formatted for each separate DEMS device 105 and/or according to an API for each separate DEMS device 105. Indeed, a corresponding search string (e.g. corresponding to the search string received from the requesting device 103) and identification information may be transmitted to each of the DEMS devices 105. As described above, the corresponding search strings may be the same or different from one another (e.g. the search string may be parsed into different search strings). Furthermore, the corresponding search strings may be formatted in accordance with a locally stored API mapping that defines search string format requirements for each DEMS device 105.

Furthermore, in some examples, the DEMS devices 105 to which corresponding search strings and identification information are transmitted may be filtered geographically. For example, when metadata received from the requesting device 103 with the search string at the block 302 includes a geographic area, the device 101 may provide corresponding search strings and the identification information to a plurality of separate DEMS devices 105 associated with agencies and/or jurisdictions inside the geographic area, and not provide corresponding search strings and the identification information to DEMS devices 105 associated with agencies and/or jurisdictions outside the geographic area. In some examples, the device 101 may store a geographic mapping of each DEMS device 105 and provide corresponding search strings and the identification information to a plurality of separate DEMS devices 105 inside the geographic area specified in the search string metadata, and as determined via the mapping. In yet further examples, the device 101 may determine a geographic location of a DEMS device 105 via a query to the DEMS device 105.

At a block 306, the controller 220 and/or the device 101 receives, from at least a particular DEMS device 105, of the plurality of separate DEMS devices 105, a digital evidence record based on the search string, the digital evidence record describing a piece of digital evidence maintained by the particular DEMS device 105 including chain-of-custody information (e.g. as stored at the databases 109, 111 thereof). As described below, the chain-of-custody information may include one or both of original chain-of-custody information and subsequent chain-of-custody information.

Hence, for example, each DEMS device 105 that receives corresponding search strings and the identification information from the device 101 may retrieve information identifying digital evidence from a respective evidence database 109 based on a respective corresponding search string, and further retrieve corresponding chain-of-custody information associated with the digital evidence from a respective custody database 111.

In some examples, the chain-of-custody information identifies original chain-of-custody of the piece of digital evidence from capture to storage. The original chain-of-custody may include information regarding a user and/or a public safety agent and/or an agency that uploaded and/or logged a piece of digital evidence, for example using an evidence storage device 107, and the like, as well as times and/or locations that the piece of digital evidence was uploaded and/or captured, and/or any other suitable chain-of-custody information including, but not limited to, an identifier of a content capture and/or evidence storage device 107 that captured the piece of evidence (e.g. a media access control (MAC) address), network path information of a network path used to upload and/or capture the piece of digital evidence and/or time stamps thereof and/or cyclic redundancy check (CRC) check information (and the like) and/or current CRC check verification data (and the like).

In other examples, the chain-of-custody information identifies subsequent chain-of-custody of the piece of digital evidence from storage to subsequent accesses thereof. The subsequent chain-of-custody may include information regarding a user and/or a public safety agent and/or an agency that accessed and/or downloaded and/or copied, and the like, a piece of digital evidence, for example using a requesting device 103 and/or the device 101, and the like, as well as times and/or locations that the piece of digital evidence was accessed, and the like, and/or any other suitable subsequent chain-of-custody information including, but not limited to, network path information of a network path used to access the piece of digital evidence and/or time stamps thereof and/or cyclic redundancy check (CRC) check information (and the like) of copied and/or downloaded digital evidence and/or current CRC check verification data (and the like).

However, in other examples, the chain-of-custody information identifies: the original chain-of-custody of the piece of digital evidence from capture to storage; and subsequent chain-of-custody information identifying one or more users and one or more agencies that have subsequently accessed the piece of digital evidence, for example using a requesting device 103 and/or the device 101. Hence, for example, when a piece of digital evidence is accessed at an evidence database 109 after initial storage, a respective DEMS device 105 updates a corresponding chain-of-custody information at the respective custody database 111 identifying the one or more users, user roles, and/or agencies that accessed the piece of digital evidence. In yet further examples, the chain-of-custody information may further identify "artificial intelligence" and/or machine learning algorithms, and/or non-human entities the like, which accessed a piece of digital evidence.

For example, the subsequent chain-of-custody information may include, for each of the one or more users and/or the one or more agencies that have subsequently accessed the piece of digital evidence, but is not limited to, one or more of: a respective public safety role (e.g. a rank and/or title, and the like of a user); user contact information; agency contact information; a public safety case identifier (e.g. a case number of a case that a user accessing the information is working on); case parameters (e.g. a perpetrator name, an incident type, an incident location, an incident case lead, and the like), a user supervisor name; contact information of a user agency membership information identifying a respective agency to which the one or more users belong, and/or any other suitable chain-of-custody data and/or chain-of-custody metadata. In some examples, the subsequent chain-of-custody information may include, but a stored indication of whether a particular user/agency that accessed a piece of evidence received only a record and/or metadata of the piece of evidence, only the piece of evidence, or both.

In yet further examples, the subsequent chain-of-custody information may include, but is not limited to, contact information for contacting at least one of the one or more users and the one or more agencies.

At an optional block 308, the controller 220 and/or the device 101 may generate one or more electronic collaboration suggestions as a function of chain-of-custody information and/or as a function of original chain-of-custody information and/or as a function of subsequent chain-of-custody information.

In particular, the one or more electronic collaboration suggestions may be based on one or more of the factors described hereafter.

In some examples, the one or more electronic collaboration suggestions may be based on a comparison between a role or agency membership of a user associated with the requesting device 103 and a corresponding role or corresponding agency membership identified in the chain-of-custody information (e.g. received from a DEMS device 105). For example, a role or agency membership of a user associated with the requesting device 103 may match a corresponding role or corresponding agency membership identified in the chain-of-custody information; alternatively, a role or agency membership of a user associated with the requesting device 103 may be similar to a corresponding role or corresponding agency membership identified in the chain-of-custody information, for example as based on hierarchies (e.g. ranks) and/or titles the like and/or as identified using machine learning algorithms. In a specific example, when a user originating a search is a traffic enforcement officer, and a user identified in the chain-of-custody information is a tollway enforcement officer, a match may occur; alternatively, the device 101 may store exceptions (and/or machine learning algorithms may be trained to identify such exceptions) such that a traffic enforcement officer is not matched to a tollway enforcement officer.

In some examples, the one or more electronic collaboration suggestions may be based on the search string received at the block 302. For example, the search string may include a name of a perpetrator (and/or suspect, and the like) and the one or more electronic collaboration suggestions may include names of other users that have previously searched for the same perpetrator.

In some examples, the one or more electronic collaboration suggestions may be based on the corresponding search strings provided at the block 304. For example, the corresponding search strings may include the name of a perpetrator and the one or more electronic collaboration suggestions may include names of other users that have previously searched for the same perpetrator.

In some examples, the one or more electronic collaboration suggestions may be based on a time of a search associated with one or more of the search string and the corresponding search strings. For example, the one or more electronic collaboration suggestions may include names of other users that have previously searched for similar data in the search string within a given time period of the time of the search associated with one or more of the search string and the corresponding search strings.

In some examples, the one or more electronic collaboration suggestions may be based on a location associated with one or more of the search string and the corresponding search strings. For example, the one or more electronic collaboration suggestions may include names of other users that have previously searched for similar data in the search string within a given geographic area that includes the location associated with one or more of the search string and the corresponding search strings.

In some examples, the one or more electronic collaboration suggestions may be based on metadata associated with one or more of the search string and the corresponding search strings. For example, a time and/or location, and the like, associated with a search, and as described above, may be specified in the metadata and the one or more electronic collaboration suggestions may be generated as described above with respect to the time and the location.

In some examples, the one or more electronic collaboration suggestions may be based on a search history associated with one or more of the search string and the corresponding search strings. For example, previous search results of searches initiated by the user that originated the search string may be stored (e.g. at the device 101) and such previous search strings and/or previous search results may be subsequently searched to provide one or more collaboration suggestions and/or be used to establish search patterns of the user (e.g. using related search strings and/or related search results, for example search strings searching a same and/or similar time period and/or for a same and/or similar location).

Indeed, electronic collaboration suggestions generated by the device 101 may be based on any suitable data and/or identifying information and/or metadata associated with one or more of the search string and the corresponding search strings and/or search patterns. Such collaboration suggestions are described in more detail below with respect to FIG. 5; however, such collaboration suggestions may include suggestions of users and/agencies that a user of the requesting device 103 may collaborate with in an investigation, and the like, associated with the search string (e.g. received at the block 302).

In some examples, the collaborations suggestions may be weighted.

For example, in some embodiments, the controller 220 and/or the device 101 may: receive (e.g. at the block 306), from a plurality of particular DEMS devices 105, of the plurality of separate DEMS devices 105 digital evidence records corresponding to the search string, the digital evidence records identifying pieces of digital evidence managed by respective ones of the plurality of particular DEMS devices 105; and receive respective chain-of-custody information associated with each of the digital evidence records.

The controller 220 and/or the device 101 may calculate weighted collaboration metrics for each of the respective chain-of-custody information based on two or more of: agency role of a public safety agent identified in the respective chain-of-custody information; a most recent access time indicated in the respective chain-of-custody information; a number of accesses by one or more of users and agencies indicated in the respective chain-of-custody information; and a geographic distance of one or more of the users and the agencies indicated in the respective chain-of-custody information.

Different factors may be weighted differently. For example, agency role, a most recent access time, a number of accesses, and a geographic distance (e.g. from a location associated with the search string to a location associated with a piece of digital evidence) may all have different weights as indicated by associated relevancy multipliers that apply to default weights stored at the device, and/or various weights may be stored at the device 101 and associated with different factors. Such weights may be numerical weights and/or such weights may be determined using any suitable machine learning algorithm, and the like.

In one example, when the search string (received at the block 302) is associated with a user having a given rank, and an agency role of a public safety agent that previously access an associated piece of digital evidence is of a same given rank, a weight of the public safety agent may be higher and/or numerically higher than when their rank is different from the user and/or lower than the user. A most recent access time, a number of accesses, and a geographic distance may be similarly weighted (e.g. with more recent access times, higher number of accesses and/or closer geographic distance weighted higher than, respectively, less recent access times, lower number of accesses and/or further geographic distances, and the like).

Such weighting may be implemented using numerical methods and/or machine learning algorithms and the like.

A list of weighted collaboration suggestions may be provided at a requesting device 103, for example in an order of highest weighted collaboration suggestions being provided higher in the list, and lower weighted collaboration suggestions being provided lower in the list. In some examples, collaboration suggestions below a given threshold weight score may not be provided. Examples of a list of weighted collaboration suggestions are described below with respect to FIG. 6.

At a block 310, the controller 220 and/or the device 101 provides, from the DEMS proxy computing device 101, to the requesting device 103, the digital evidence record and the chain-of-custody information.

In particular, the device 101 transmits, to the requesting device 103, digital evidence records and associated chain-of-custody information from each DEMS device 105 that provides search results and/or aggregated search results in response to transmitting respective corresponding search strings thereto at the block 304.

However, when only one DEMS device 105 responds with the digital evidence record and the chain-of-custody information), at the block 308, the controller 220 and/or the device 101 may provide and/or transmit, to the requesting device 103, only the received digital evidence record and associated chain-of-custody information. However, at the block 308, the controller 220 and/or the device 101 may provide and/or transmit, to the requesting device 103, the received digital evidence record and associated chain-of-custody information as well as indications of null results from other DEMS devices 105 where no digital evidence based on the search string was found.

In yet further examples, at the block 310, when one or more collaboration suggestions are generated and/or weighted collaboration suggestions are generated (e.g. at the block 308), the controller 220 and/or the device 101 may provide, to the requesting device 103, a sub-selection of user and agency pairs in the respective chain-of-custody information as collaboration suggestions which may be based on the weighted collaboration metrics as calculated. For example, when a weighting scheme applied to the respective chain-of-custody information results in user and agency pairs that are above a given threshold weight score, such user and agency pairs may be sub-selected; alternatively, a given number of the highest weighted user and agency pairs may be sub-selected.

In some examples, at the block 310, only a digital evidence record may be provided to the requesting device 103 (e.g. as a result of a search); in these example, the user may subsequently request the piece of digital evidence and/or the one or more collaboration suggestions. In these examples the chain-of-custody information stored at a database 111 is updated accordingly.

In yet further examples, two or more of a digital evidence record, an associated piece of digital evidence, and the one or more collaboration suggestions may be provided to the requesting device 103, with the user subsequently requesting any of the data and/or pieces of evidence not initially provided. In these examples the chain-of-custody information stored at a database 111 is updated accordingly.

In yet further examples, the controller 220 and/or the device 101 may (e.g. at the block 310): cause a copy of the piece of digital evidence to be provided from the particular DEMS device 105 (e.g. from which a digital evidence record was received) to a separate DEMS device 105 associated with the requesting device 103; and update a local chain-of-custody record to reflect the copy of the piece of digital evidence.

For example, when the requesting device 103 of the method 300 comprises the first requesting device 103-1, and the second DEMS device 105-2 returns (in response to receiving a corresponding search string at the block 304) a digital evidence record of a piece of digital evidence stored at the evidence database 109-2, the device 101 may further: retrieve, from the second DEMS device 105-2, a copy of the piece of digital evidence stored at the evidence database 109-2; and transmit the copy of the piece of digital evidence to the first DEMS device 105-1 for storage at the evidence database 109-1; and transmit, to the second DEMS device 105-2, for storage at the custody database 111-2, an indication of the user of the first requesting device 103-1 accessing the piece of evidence and/or an indication of the user of the first requesting device 103-1 searching for the piece of evidence and/or any other suitable chain-of-custody indicator.

In yet further examples, the device 101 may not retrieve the piece of digital evidence from the second DEMS device 105-2; rather the device 101 may transmit a command to the second DEMS device 105-2 to cause the second DEMS device 105-2 to transmit a copy of the piece of digital evidence to the first DEMS device 105-1 for storage at the evidence database 109-1.

Regardless of how the piece of digital evidence is copied, the custody database 111-2 is updated accordingly to show that copying occurred; for example a record storing the chain-of-custody information for the piece of digital evidence may be updated (e.g. with data appended thereto) to indicate that the copying occurred, an identifier of a device to which the piece of digital evidence is copied, an identifier of a user and/or an agency that initiated the copying, and the like. In some examples, the chain-of-custody information that includes the copying may be provided to the requesting device 103 in the search results. In other examples, chain-of-custody information that includes the copying may be stored and provided in later searches where the associated piece of evidence is determined to match, and the like, a search string.

Similarly, when a copy of the piece of digital evidence is stored at the evidence database 109-1, a corresponding chain-of-custody record showing chain-of-custody of the piece of digital evidence is generated and stored at the custody database 111-1. Similarly, when a copy of the piece of digital evidence is stored at the evidence database 109-1 from the evidence database 109-2, chain-of-custody information at associated records in each of the databases 111-1, 111-2 may be updated to show the copying, and/or database links between the associated records may be stored at each of the databases 111-1, 111-2/Hence, any subsequent chain-of-evidence updates where pieces of evidence are copied between the databases 109 are updated at the databases 111 (e.g., upon copying and/or periodically).

In this manner storage of digital evidence, and associated chain-of-custody records may be distributed across the system 100. Hence, when the separate agencies associated with the DEMS devices 105 have different storage retention periods, the digital evidence is stored according to the agency having the longest digital retention period, and removal of one piece of evidence and its chain-of-custody information at one DEMS device 105 in accordance with its storage retention policy may not affect the copied piece of evidence and chain-of-custody information stored at a second DEMS device 105.

Figure 4:
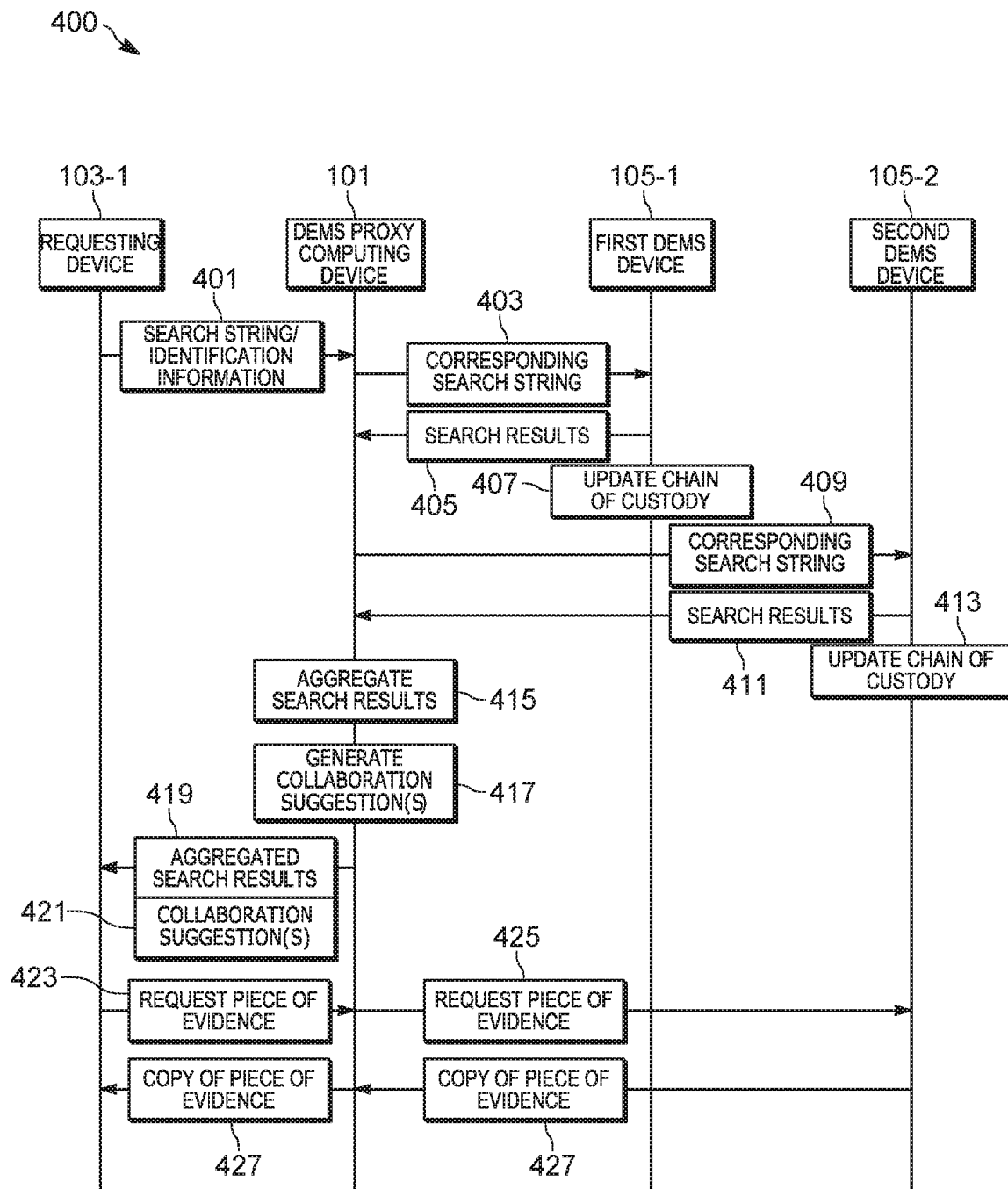
FIG. 4 is a signal diagram showing communication between components of the system of FIG. 1 when implementing a method for interoperability between digital evidence management systems, in accordance with some examples.

Attention is next directed to FIG. 4 which depicts a signal diagram 400 showing communication between the components of the system 100 during execution of an example of the method 300 at the device 101. In particular, the signal diagram 400 will be described with respect to the first requesting device 103-1 using the device 101 to search both DEMS devices 105. While not all components of the system 100 are depicted in FIG. 4, they are nonetheless understood to be present.

As depicted in FIG. 4, the first requesting device 103-1 transmits a search string 401 and identification information, and/or other metadata, to the device 101 (e.g. rather than to the first DEMS device 105-1). The device 101 generates a corresponding search string for each of the DEMS devices 105 with which the device 101 is in communication.

As depicted, the device 101 generates and transmits a corresponding search string 403 (which includes at least a portion of the identification information) to the first DEMS device 105-1, the corresponding search string 403 formatted for an API or protocol of the first DEMS device 105-1. The first DEMS device 105-1 searches the evidence database 109-1 using the corresponding search string 403 and, when a piece of digital evidence and/or a digital evidence record is found based on the corresponding search string, the first DEMS device 105-1 further searches the custody database 111-1 for corresponding chain-of-custody information. For example, information associated with the piece of digital evidence may match one or more words in the corresponding search string, however any type of search algorithm at the first DEMS device 105-1 is within the scope of the present specification including, but not limited to, searching based on machine learning algorithms and/or searching based on metadata and/or searching that is not based on matching. Indeed, such searching may include, but is not limited to, examining digital evidence metadata, such as filename, size, time, location, capturing agency, capturing officer, environmental conditions, and the like, and/or using semantic algorithms, for example to determine information about the content of pieces of digital evidence (e.g. whether pieces of digital evidence relate to people, vehicles, weapons, objects, devices, etc.).

The first DEMS device 105-1 transmits, back to the device 101, search results 405; accordingly, as described above, the search results 405 comprise a digital evidence record for the piece of digital evidence, and chain-of-custody information. The first DEMS device 105-1 further updates 407, at the custody database 111-1, the chain-of-custody record information for the piece of digital evidence at the custody database 111-1.

Similarly, the device 101 generates and transmits a corresponding search string 409 (which includes at least a portion of the identification information) to the second DEMS device 105-2, the corresponding search string 409 formatted for an API or protocol of the second DEMS device 105-2. As described elsewhere, an exact API and/or protocol used by the device 101 to communicate with the DEMS devices 105 may or may not be identical; indeed, communications between the device 101 and the devices 105 may occur using any suitable technique, including, but not limited to, REST (Representational State Transfer), HTTP (Hypertext Transfer Protocol), HTTPS (HTTP Secure), websockets, server side events, raw sockets, binary protocols, FTP (File Transfer Protocol), SFTP (Secure FTP), and the like. The second DEMS device 105-2 searches the evidence database 109-2 using the corresponding search string 409 and, when a piece of digital evidence is found based on the corresponding search string (e.g. using any suitable searching algorithm), the second DEMS device 105-2 further searches the custody database 111-2 for corresponding chain-of-custody information. The second DEMS device 105-2 transmits, back to the device 101, search results 411; accordingly, as described above, the search results 411 comprise a digital evidence record for the piece of digital evidence, and chain-of-custody information. The second DEMS device 105-2 further updates 413, at the custody database 111-2, the chain-of-custody record information for the piece of digital evidence at the custody database 111-2.

The device 101 aggregates 415 the search results 405, 411 received from the DEMS devices 105 and optionally generates 417 collaboration suggestions as described above. The device 101 transmits aggregated search results 419 and optionally collaboration suggestions 421 to the first requesting device 103-1, which may render the search results 419 and optionally the collaboration suggestions 421 at a display screen thereof.

In some examples, the device 101 may retrieve a respective copy of a piece of digital evidence identified in the aggregated search results 419 and that was found based on the corresponding search string, and provide the copy of the piece of digital evidence with the aggregated search results 419 to the first requesting device 103-1.

However, in other examples, the aggregated search results 419 do not include a copy a piece of digital evidence that was found based on the corresponding search string. In these examples, for example, as depicted, the first requesting device 103-1 transmits may subsequently transmit, to the device 101, a request 423 for a given piece of digital evidence identified in the aggregated search results 419. As depicted, the given piece of digital evidence identified in the aggregated search results 419 may be from the second DEMS device 105-2, and the device 101 hence transmit a corresponding request 425 to the second DEMS device 105-2 for the given piece of digital evidence. As depicted, the second DEMS device 105-2 receives the request 425, retrieves a copy 427 of the given piece of digital evidence from the database 109-2, updates the database 111-2 accordingly (e.g. to indicate subsequent chain-of-custody information stored therein to indicate that a copy the given piece of digital evidence has been retrieved and is being transmitted to the first requesting device 103-1), and transmits the copy 427 to the device 101. The device 101 transmits the copy 427 to the first requesting device 103-1.

While the signal diagram 400 has been described without respect to formats of communications between the depicted components of the system 100, in some examples, the formats of communications may be predefined. For example, the search strings 401, 403, 409 may be transmitted in a format of "GET" commands, while the search results 405, 411, 419 (and optionally the collaboration suggestions 421) may be transmitted in a format of "200 OK" responses to the "GET" commands with fields of the "GET" command including associated search strings, and the like, and fields of the "200 OK" responses including associated search results and the like.

Furthermore, while not depicted, the device 101 may perform successive searches of the DEMS devices 105 depending on the search results 405, 411. For example, when the search results 405, 411 result in a video and/or audio and/or incident record in which a particular perpetrator, and the like, was identified, the device 101 may perform another search for the perpetrator to identify other users searching for the perpetrator. In another example, the device 101 may, after identifying a perpetrator in the search results 405, 411, determine users with relationships to the perpetrator and issue subsequent searches for others with associated relationships. However, in other examples, chain-of-custody information returned with the search results 405, 411 may identify other users searching for the perpetrator or others with relationships to the perpetrator which may obviate a second search.

Attention is next directed to FIG. 5 which depicts an example of a aggregated search results 500 that results from a search string 501 being transmitted to the device 101 from a requesting device 103. For example, as depicted, the search string comprises a search for a name "Ralph Wells". While not depicted, the search string 501 may further include metadata that identifies characteristics of the user that generated the search string 501, a public safety agency affiliation, a date and/or time that the search string 501 was generated and/or received and/or a location associated with the user and/or the requesting device 103 and/or the public safety agency affiliation, and the like. Furthermore, while not depicted, the search string 501 may include a date and/or ranges of dates, and/or time and/or range of times, and/or a location and/or a geographic area, to place boundaries around a search that results from the search string 501.

In particular, the search string 501 may be received at the device 101 at the block 302 of the method 300, the device 101 may subsequently search the DEMS devices 105 at the block 304 of the method 300 and receive, at the block 306, one or more digital evidence records from the DEMS devices 105, including chain-of-custody information. The device 101 may then generate, at the block 310, the aggregated search results 500 depicted in FIG. 5 from the one or more digital evidence records received from the DEMS devices 105, including chain-of-custody information. Hence, the aggregated search results 500 depicted in FIG. 5 may generally correspond to the digital evidence record and chain-of-custody information of the block 310 of the method 300.

The aggregated search results 500 may be rendered at a display screen of the requesting device 103 from which the search string 501 was transmitted.

As depicted, the search string 501 has resulted in one or more of the DEMS devices 105 returning a name 502 of a video file ("VIDEO_FILE_EXAMPLE.mp4"). As will be explained hereafter, the video file may be stored at a database 109 in association with the name in the search string 501.

Also provided in the aggregated search results 500 is original chain-of-custody information 503 indicating a public safety agent that captured the video file (e.g. "JOHN SMITH"), their role ("OFFICER"), their public safety agency affiliation ("SAN ANTONIO PD"), an identifier of a content device (e.g. a MAC address of a content capture and/or evidence storage devices 107) that captured the video file, and a CRC code of the video file as uploaded.

As depicted the aggregated search results 500 further includes subsequent chain-of-custody information 505 showing, for example and among other entries, a DEMS device 105 to which the video file was initially uploaded (e.g. "San Antonino PD DEMS", or San Antonio Police Department), and DEMS devices 105 to which the video file was subsequently copied (e.g. "Harris County PD DEMS" and "Dallas PD DEMS"). A CRC code of a copy of the video file as stored at each of the identified DEMS devices 105 is also provided; when the CRC codes of the subsequent chain-of-custody information 505 matches the CRC code of the video file (e.g. as depicted), such matching may be evidence of an accurate reproduction/chain of custody at the various DEMS devices 105.

The subsequent chain-of-custody information 505 further includes identifiers (e.g. names) of public safety agents who successively accessed the video file at the various DEMS devices 105, including their affiliations and dates of the access, as well as associated case numbers for which the video file was accessed (e.g. at the various storage locations).

For example, as depicted, the video file was accessed at a DEMS device 105 to which the video file was initially uploaded, for example the "San Antonio PD DEMS", by "Detective Jerome Daniels" in connection with a case number (e.g. "CASE 1234567890"), an identified perpetrator (e.g. "RALPH WELLS") and index information indicating where in the video file the identified perpetrator has been identified (e.g. "00:02:21"). The case number may refer to a case associated with the search that the public safety agent who performed the subsequent access (e.g. "Detective Jerome Daniels") and/or is associated with the video file (e.g. the video file may have been uploaded in conjunction with the case number, and/or may have been added as a result of the subsequent access by the public safety agent). As depicted, the identified perpetrator ("Ralph Wells"), as well as the index information may have been identified in the video file by the public safety agent who performed the subsequent access for example in a "Comment" stored in association with the video file. However, the identified perpetrator ("Ralph Wells") as well as the index information may have been identified in the video file using video analytics performed on the video file before or after uploading and stored in association therewith.

Hence, as the search string 501 included the name of the identified perpetrator ("Ralph Wells"), and the name of the identified perpetrator ("Ralph Wells") is associated with the video file, the video file was returned in the aggregated search results 500.

In other examples, the search string 501 may include the case number and/or any other suitable data (e.g. a date, time, location, and the like) which may also have resulted in the video file being provided in the aggregated search results 500.

As depicted, the subsequent chain-of-custody information further includes names of public safety agents that accessed copies of the video file at DEMS devices 105 other than the DEMS device 105 to which the video file was initially uploaded, along with a corresponding case numbers associated with the access. For example, as depicted, Detective John Chenney accessed the video file as copied to a DEMS device 105 associated with the Harris County Police Department on Nov. 26, 2018 at 07:46 in association with the case number 987654321.

Similarly, Sergeant Adam Lewis accessed the video file as copied to a DEMS device 105 associated with Dallas Police Department on Nov. 14, 2018 at 15:46 in association with the case number 8475611994; in this example, the public safety officer further provided a comment that he was searching for a perpetrator named "Ralph Wells", and which may be stored at an associated database 111 associated with Dallas Police Department; hence, in some examples, the comment at the associated database 111 associated with Dallas Police Department may also have resulted in the video file being identified from the search string 501 as the comment "Ralph Wells" matches the search string 501.

In some examples, the aggregated search results 500 may be provided with a copy of the video file, while in other examples, the aggregated search results 500 may not be provided with a copy of the video file; in the latter examples the video file may be subsequently requested via the device 101 as described above with regards to FIG. 4. For example, as depicted, the aggregated search results 500 include a soft button 507 which, when actuated (e.g. via an input device of the requesting device 103 where the aggregated search results 500 are provided) may cause the video file to be requested from the device 101.

In some examples, the aggregated search results 500 may further include a list of collaboration suggestions as generated at the block 308 of the method 300. However, in other examples, as depicted, a list of collaboration suggestions may be subsequently requested from the device 101. For example, as depicted, the aggregated search results 500 include a soft button 509 which, when actuated (e.g. via an input device of the requesting device 103 where the aggregated search results 500 are provided) may cause a list of collaboration suggestions file to be requested from the device 101.

For example, attention is next directed to FIG. 6 which depicts a list of collaboration suggestions 600 that may be provided with the aggregated search results 500 of FIG. 5 and/or may be provided to the requesting device 103 from which search string 501 originated in response to the soft button 509 being actuated.

The collaboration suggestions 600 may be generated based on characteristics of the user that generated the search string 501 and may include names, roles and public agency affiliations of public safety agents, and the like from the chain-of-custody information 503, 505, and may include a name, role and/or public agency affiliation of a public safety agent that had originally uploaded the video file, for example based on a match between characteristics of the user that generated the search string 501 and of the public safety agent that had originally uploaded the video file. Similarly, the collaboration suggestions 600 may be based on a match between characteristics of the user that generated the search string 501 and of public safety agents that had subsequently accessed the video file.

In some embodiments, some of the collaboration suggestions 600 may be weighted and/or ranked according to various factors, with higher weighted collaboration suggestions 600 appearing higher in the list. For example, as depicted, users that accessed the video file that have a same role as the user that operated the requesting device 103 to transmit the search string 501 are higher in the list of collaboration suggestions 600 than users that searched for and/or accessed similar information (e.g. users that searched for the perpetrator "Ralph Wells") and/or users that searched for a similar location and time as the location and time associated with the video file and/or the perpetrator.

Furthermore, as depicted, the collaboration suggestions 600 may be provided as a sub-selection of user and agency pairs. For example, each public safety agent is identified along with an associated public safety agency (e.g. "Detective Jerome Daniels-San Antonio PD").

Hence, when the aggregated search results 500 is provided to a requesting device 103 in response to the search string 501, a user of the requesting device 103 is provided with the chain-of-custody information 505, and optionally the collaboration suggestions 600, which may cause or allow the user to contact the other users identified in the aggregated search results 500 to promote collaboration between the users.

Provided herein is a device, system and method to establish interoperability between multiple independent DEMS devices. A DEMS proxy computing device is used as a proxy device for a requesting device to search the multiple independent DEMS devices. The DEMS proxy computing device receives a search string from a requesting device and formats corresponding search strings for each of the multiple independent DEMS devices. When the DEMS proxy computing device receives search results (e.g. a digital evidence record based on the search string, the digital evidence record describing a piece of digital evidence maintained by the particular DEMS device, and including chain-of-custody information), from the multiple independent DEMS devices, the DEMS proxy computing device may aggregate and transmit the search results back to the requesting device and optionally generate collaboration suggestions that are transmitted back to the requesting device. In this manner, configuring processing resources and communication links at the requesting device to search the multiple independent DEMS devices individually may be obviated.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method for generating collaboration suggestions between multiple independent digital evidence management systems (DEMS) devices, the method comprising:
   receiving, at a DEMS proxy computing device, from a requesting device, a search string requesting digital evidence, the search string comprising one or more user search strings;
   providing, from the DEMS proxy computing device, to a plurality of separate DEMS devices maintained by separate public safety agencies:
      corresponding search strings; and
      identification information identifying: a first user of the requesting device, and a first public safety agency membership of the first user;
   receiving, at the DEMS proxy computing device, from at least a particular DEMS device, of the plurality of separate DEMS devices, a digital evidence record based on the search string, the digital evidence record describing a piece of digital evidence managed by the particular DEMS device and particular metadata associated with the digital evidence record identifying at least a second user and a second public safety agency membership of the second user that had previously accessed one or both of the digital evidence record and the metadata associated with the digital evidence record;
   generating, at the DEMS proxy computing device, a collaboration suggestion information identifying the second user and the second public safety agency membership based on one or more of:
      a comparison between a determined role of the first user and a determined role of the second user;
      a comparison between the first public safety agency membership of the first user and the second public safety agency membership of the second user; and
      a comparison between second metadata associated with the search string and the particular metadata selected from one or more of: a matching digital evidence search date or date range, a matching digital evidence search time or time range, a matching name or object identified in video or audio digital evidence, and a matching digital evidence search location or geographic search range; and
   providing, from the DEMS proxy computing device, to the requesting device, the digital evidence record and the collaborations suggestion information.

2. The method of claim 1, wherein the identification information further identifies a public safety role of the first user of the requesting device.

3. The method of claim 1, the digital evidence record further including chain-of-custody information selected from one or both of:
   an original chain-of-custody of the piece of digital evidence from capture to storage; and
   subsequent chain-of-custody information identifying every user and their associated membership agency that have subsequently accessed the piece of digital evidence.

4. The method of claim 3, wherein the particular metadata further comprises one or both of user contact information for contacting the second user and agency contact information for contacting the second public safety agency.

5. The method of claim 1, further comprising generating, at the DEMS proxy computing device, the collaboration suggestion information as a function of the comparison between the determined role of the first user and the determined role of the second user.

6. The method of claim 1, further comprising generating, at the DEMS proxy computing device, the collaboration suggestion information as a function of the comparison between the first public safety agency membership of the first user and the second public safety agency membership of the second user.

7. The method of claim 1, further comprising generating, at the DEMS proxy computing device, the collaboration suggestion information as a function of the comparison between the second metadata associated with the search string and the particular metadata selected from one or more of: the matching digital evidence search date or date range, the matching digital evidence search time or time range, the matching name or object identified in video or audio digital evidence, and the matching digital evidence search location or geographic search range.

8. The method of claim 7, further comprising generating, at the DEMS proxy computing device, the collaboration suggestion information as a function of the comparison between the second metadata associated with the search string and the particular metadata selected from: the matching digital evidence search date or date range and the matching digital evidence search time or time range.

9. The method of claim 7, further comprising generating, at the DEMS proxy computing device, the collaboration suggestion information as a function of the comparison between the second metadata associated with the search string and the particular metadata selected from: the matching name or object identified in video or audio digital evidence.

10. The method of claim 7, further comprising generating, at the DEMS proxy computing device, the collaboration suggestion information as a function of the comparison between the second metadata associated with the search string and the particular metadata selected from: the matching digital evidence search location or geographic search range.

11. The method of claim 1, further comprising:
   causing, via the DEMS proxy computing device, a copy of the piece of digital evidence to be provided from the particular DEMS device to a separate DEMS device associated with the requesting device; and
   updating, at the DEMS proxy computing device, a local chain-of-custody record to reflect the copy of the piece of digital evidence.

12. The method of claim 1, further comprising:
   receiving, at the DEMS proxy computing device, from a plurality of particular DEMS devices, of the plurality of separate DEMS devices, digital evidence records corresponding to the search string, the digital evidence records identifying pieces of digital evidence managed by respective ones of the plurality of particular DEMS devices;

receiving, at the DEMS proxy computing device, respective particular metadata associated with each of the digital evidence records;

calculating, at the DEMS proxy computing device, a weighted collaboration metric for each of the respective particular metadata based on two or more of:
  agency role of a public safety agent identified in the particular metadata;
  a most recent access time indicated in the respective particular metadata;
  a number of accesses by one or more of users and agencies indicated in the particular metadata; and
  a geographic distance of one or more of the users and the agencies indicated in the particular metadata; and providing, from the DEMS proxy computing device, to the requesting device, a sub-selection of user and agency pairs in respective collaboration suggestion information as collaboration suggestions based on the weighted collaboration metric as calculated.

13. The method of claim 1, wherein the DEMS proxy computing device and the plurality of separate DEMS devices communicate via respective authenticated communication links.

14. A device to generate collaboration suggestions between multiple independent digital evidence management systems (DEMS) devices, the device comprising:

a communication unit; and a controller interconnected with the communication unit, the controller configured to:
  receive, via the communication unit, from a requesting device, a search string requesting digital evidence, the search string comprising one or more user search strings;
  provide, via the communication unit, to a plurality of separate DEMS devices maintained by separate public safety agencies:
    corresponding search strings; and
    identification information identifying: a first user of the requesting device, and a first public safety agency membership of the first user;
  receive, via the communication unit, from at least a particular DEMS device, of the plurality of separate DEMS devices, a digital evidence record based on the search string, the digital evidence record describing a piece of digital evidence managed by the particular DEMS device and particular metadata associated with the digital evidence record identifying at least a second user and a second public safety agency membership of the second user that had previously accessed one or both of the digital evidence record and the metadata associated with the digital evidence record;
  generate a collaboration suggestion information identifying the second user and the second public safety agency membership based on one or more of:
    a comparison between a determined role of the first user and a determined role of the second user;
    a comparison between the first public safety agency membership of the first user and the second public safety agency membership of the second user; and
    a comparison between second metadata associated with the search string and the particular metadata selected from one or more of: a matching digital evidence search date or date range, a matching digital evidence search time or time range, a matching name or object identified in video or audio digital evidence, and a matching digital evidence search location or geographic search range; and
  provide, via the communication unit, to the requesting device, the digital evidence record and the collaborations suggestion information.

* * * * *